United States Patent [19]
Ohayon

[11] Patent Number: 5,131,035
[45] Date of Patent: Jul. 14, 1992

[54] APPARATUS AND METHOD FOR PROTECTION OF COIN OPERATED TELEPHONES

[75] Inventor: David Ohayon, Hewitt, N.J.

[73] Assignees: Renault Metal Products, Ltd., Middle Village; Resco Metal Products Corp., Brooklyn, both of N.Y.

[21] Appl. No.: 678,671

[22] Filed: Apr. 1, 1991

Related U.S. Application Data

[63] Continuation-in-part of Ser. No. 587,418, Sep. 25, 1990, abandoned.

[51] Int. Cl.$^5$ .................. H04M 1/18; H04M 17/02
[52] U.S. Cl. ........................ 379/437; 379/143; 379/145; 379/440; 194/202
[58] Field of Search ............ 379/155, 143, 437, 145, 379/440, 451; 194/202

[56] References Cited

U.S. PATENT DOCUMENTS

| | | |
|---|---|---|
| 2,716,882 | 9/1955 | Gill et al. |
| 3,213,210 | 10/1965 | Samples ............................ 379/143 |
| 3,297,123 | 1/1967 | Hutchins . |
| 3,335,945 | 8/1967 | Hutchins . |
| 3,391,256 | 7/1968 | Nawman . |
| 3,833,104 | 9/1974 | Blum . |
| 3,910,393 | 10/1975 | de Crepy . |
| 4,159,054 | 6/1979 | Yoshida . |
| 4,267,411 | 5/1981 | Raines . |
| 4,406,358 | 9/1983 | Zahradnik . |
| 4,946,095 | 8/1990 | Anello et al. ..................... 379/145 |
| 5,018,193 | 5/1991 | DeArkland .......................... 379/145 |

OTHER PUBLICATIONS

"Renault Secures Payphones", Payphone Exchange, Sep. 1989, p. 9.

Primary Examiner—Stafford D. Schreyer
Attorney, Agent, or Firm—Dilworth & Barrese

[57] ABSTRACT

A protective cover is disclosed for coin operated telephones which includes a coin box for storage of coins and a coin return opening for providing the user with a refund of unused coins. The protective cover is constructed of heavy gauge protective steel plate and is dimensioned to extend across the entire width of the telephone while providing limited, but sufficient access to the coin return opening of the telephone by including a relatively small opening to provide such access. A door which blocks the opening in the steel plate is pivotally mounted to the rear surface of the plate and is dimensioned to pivot rearwardly when returned coins are retrieved by the user, thus preventing stuffing of the coin return area. The door is greater in the vertical dimension than the vertical dimension of the relatively small coin return access opening and includes a rearwardly depending flange at the lower edge portion and a forwardly depending flange along each vertical side portion to prevent tampering or stuffing of the opening. The vertical flanges are approximately equal in length to the vertical dimension of the opening and extend forwardly to the forward surface of the steel plate. Limited pivotal movement of the coin return protective door is permitted by the protective cover. The protective cover is permanently attached to the locked cash box vault door and is therefore readily removable along with the vault door. A method for protection of coin operated telephones is also disclosed.

33 Claims, 2 Drawing Sheets

APPARATUS AND METHOD FOR PROTECTION OF COIN OPERATED TELEPHONES

CROSS REFERENCE TO RELATED APPLICATIONS

This application is a continuation-in-part of application No. 07/587,418, filed Sep. 25, 1990, now abandoned, and design application No. 07/587,419, filed Sep. 25, 1990.

BACKGROUND OF THE INVENTION

1. FIELD OF THE INVENTION

This invention relates to an apparatus for protection of coin operated telephones of the type wherein a protective cover plate is removably positioned over the coin accumulation and return areas of the telephone.

2. Description of the Prior Art

Public coin operated telephones have in the past, been provided with a coin accumulation lock box and a coin return scoop for returning unused coins to the user. In the past, the coin return scoop was merely constructed as an arcuate slide upon which coins were deposited for retrieval by the user when a telephone call made by the user was not completed or the call was terminated prior to completion. In essence, the purpose of the coin return was to provide the user with an immediate refund when the service could not be rendered. Access to coins was provided by a simple opening communicating with the coin return scoop.

As public vandalism has increased, it has taken its toll on public telephones, making the telephones the object of numerous types of vandal attacks. Coin return scoops, openings and coin boxes have been destroyed in efforts by vandals to remove coins from the telephones illegally. This activity necessitated the development of a pivotally mounted coin return door which somewhat restricted the access to the coin return scoop to prevent the introduction of illegal devices. However, subsequently other techniques and devices to gain access to the coin return area were developed by vandals. Even explosives such as M80 fireworks have been used to gain illegal access to the coins in public telephones.

In the recent past, certain attempts have been made to protect public telephones by providing a protective cover in the region of the coin box. It was assumed that providing a protective cover to the coin box would supplement the protection provided by the pivotal coin return door to protect all coins in the telephone. However, these attempts were not as successful as would otherwise have been expected, since the vandalism continued against the coin destructive protective doors and adjacent areas. In some instances, the protective cover was actually removed with structured tools. For example, such devices were not constructed to extend across the entire width of the telephone, nor were they fabricated of sufficiently heavy duty materials of sufficient dimensions to provide adequate protection. Thus, they were subject to removal by prying or other techniques.

Attempts at eliminating vandalism by providing a protective cover over the entire width of the telephone enjoyed significant success. Such success was even further improved by providing cover protection over the hinge of the coin return door in the manner disclosed in my copending application No. 07/517,418, filed Sep. 25, 1990.

However, experience with such improved devices has demonstrated that there exists room for yet further improvements in the coin return area. For example, it has been observed that vandals would stuff the area between the rear face of the protective cover and the forward face of the coin return door, thereby jamming the coin return door in the rearward position, i.e. the position which the door temporarily assumes when coins are being retrieved. Thus, with the coin return door so jammed, the returned coins tend to accumulate behind the coin return door giving the consumer the impression that the coin is lost. After sufficient time has lapsed the vandal will return to the telephone and remove the stuffing materials, i.e. paper, chewing gum, tissues, etc. This action permits the coins to drop into the coin return scoop for illegal removal by the vandal.

I have invented an apparatus for protection of coin operated telephones by providing a protective cover which extends across the entire width of the telephone in the coin box and coin return region while providing blocking protection for the coin return access opening.

SUMMARY OF THE INVENTION

A protective cover for a coin operated telephone which extends substantially over the width of the telephone in the coin accumulation box and coin return regions, the cover having means to provide user access to the coin return portion of the telephone. Means attached to the cover in the coin return region and selectively movable by the user from a first position which blocks the coin return region of the telephone and a second position which permits user access to the coin return region.

Preferably, the protective cover is provided for a coin operated telephone which includes a coin return opening and a pivotally mounted protective coin return door in the region of the coin return opening. The cover comprises a protective plate dimensioned and configured to be removably attached to the telephone in the coin box and coin return opening regions of the telephone. The invention also comprises means to provide user access to the telephone coin return opening, and means to protect the upper portion of the coin return door while permitting pivotal movement of the door to facilitate removal of coins from the return opening of the telephone. Means is attached to the protective cover in the coin return region and selectively movable by the user from a first position which blocks the coin return opening of the telephone and a second position which permits access to the coin return opening while blocking access to the space between the coin return door and the protective plate. The means to block the coin return opening is a plate member pivotally attached to the protective cover over the coin removal access opening. The plate member has a perpendicular lip at the lower edge and is pivotally movable from a first position which blocks the coin return access opening to a second position in engagement with the coin return door and which prevents insertion of objects in the space between the protective cover and the coin removal protective door when the protective door is pivoted to the coin removal position. Preferably the plate member includes outwardly extending vertical flanges along each side which nestle within the coin return opening and preferably extend outwardly to the front surface of the protective plate. Such flanges may optionally extend outwardly of the front surface of the protective plate. The plate member is welded to a hinge which is welded to the rear surface of the protective cover above the telephone coin return opening. Other suitable attachment techniques may be used.

The protective cover according to the preferred embodiment is structured to protect a telephone which includes a coin box for accumulation of user deposited coins. The coin box is adjacent the coin return opening and the protective plate extends across the width of the telephone over the coin box region and the coin return region. The protective plate is preferably comprised of a stainless steel plate approximately 7 gauge thickness (i.e. about 3/16 inch). The protective plate includes an access opening to permit user access to the coin return opening of the telephone and preferably comprises a forwardly extending indentation which permits forward pivotal movement of at least a portion of the coin removal protective door of the telephone. The coin box includes a locking protective cover door and an opening is provided in the protective plate to permit key access to the lock of the coin box door.

The protective cover further comprises means to provide access to a second lock for the coin box door positioned on one side portion of the telephone. The coin removal access opening in the cover plate preferably has a rectangular shape and is approximately 1¼ inch in width and approximately ⅞ inch in height. The protective cover is preferably permanently attached to the coin box door by welding. Other attachments are contemplated.

The pivotal door which extends across the opening of the protective cover is preferably dimensioned larger than the opening in the protective cover to prevent entry beyond the cover.

In a preferred embodiment, a protective cover is provided for a coin operated telephone which includes a coin box for locked reception of user deposited coins, coin return means for reception of coins returned to the user, access opening to provide user access to the coin return means. The cover comprises a protective cover plate dimensioned to extend over the width of the telephone in the coin box and coin return area, the cover plate including rearwardly depending flanges at each end to protect at least portions of the sides of the telephone, means to provide user access to the coin return means. A plate member forms a door which is pivotally mounted over the coin return access opening of the cover plate and adapted to block the coin return access opening when at rest and pivotal to a second position by engagement of the user's finger to cause the coin return access door to pivot rearwardly. The protective cover door thereby blocks access to the region between the protective plate and coin return access door to prevent stuffing the space with foreign objects to prevent illegal storage and removal of coins returned to users. Means is provided to facilitate selective removal of the cover plate to provide selective access to the coin box for removal of coins therefrom.

In the preferred embodiment, the protective cover for the coinbox-containing portion of a pay telephone of generally box-like construction comprises a front panel flanked by a pair of parallel, rearwardly-extending side wall panels to define a generally U-shaped construction, the construction adapted and arranged to closely abut the front and side panels of the telephone. The front panel is adapted to be permanently fastened to the coinbox cover of the telephone, and further includes means located thereon to allow operation of and access to the coin return system of the telephone and to permit access to the coinbox removal means of the telephone. Means to allow access to the coin return system is provided with means selectively movable from a first position which blocks the access means to a second position which permits user access to the coin return system of the telephone.

The coin return access means comprises an entryway to the coin return slot of the telephone and an integral raised portion of the front panel positioned to overlie the top portion of the coin return door plate of the telephone. The coin return system of the telephone includes a pivotally mounted coin return door and means to block the entryway is a door pivotally attached to the front panel. This door is dimensioned to block the entryway and is movable to the second position whereby the lower marginal portion engages the coin return door of the telephone. The coinbox removal means comprises a first notch in a side wall panel to expose a side-mounted lock on the telephone and a key entryway on the front panel aligned with the telephone coinbox lock. Further, cover is fastened to the coinbox cover by welding.

The cover may be structured to accommodate telephones having the coin return either on the right side of center or the left side.

A method is disclosed for protection of a coin operated telephone from unauthorized removal of coins, the telephone having a coin box and coin return access opening adjacent the coin box region, a pivotal door to protect the coin return opening, which comprises providing a protective cover dimensioned to extend across the entire width of the telephone over the coin box and being constructed of material and of thickness which protects the telephone coin box from unauthorized entry and the pivotal coin return door while permitting forward pivotal movement of the upper portion, providing an opening in said protective cover directly over the coin return opening of the telephone, the opening being of sufficiently less dimensions than the coin return opening of the telephone so as to provide limited access to the coin return opening to protect the coin return opening from unauthorized entry, and providing a pivotal door over the coin return opening in the protective cover whereby the pivotal door is movable from a first rest position blocking the opening to a second position in engagement with the coin return protective door of the telephone to prevent insertion of foreign objects therebetween to prevent illegal storage and removable of coins therefrom.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
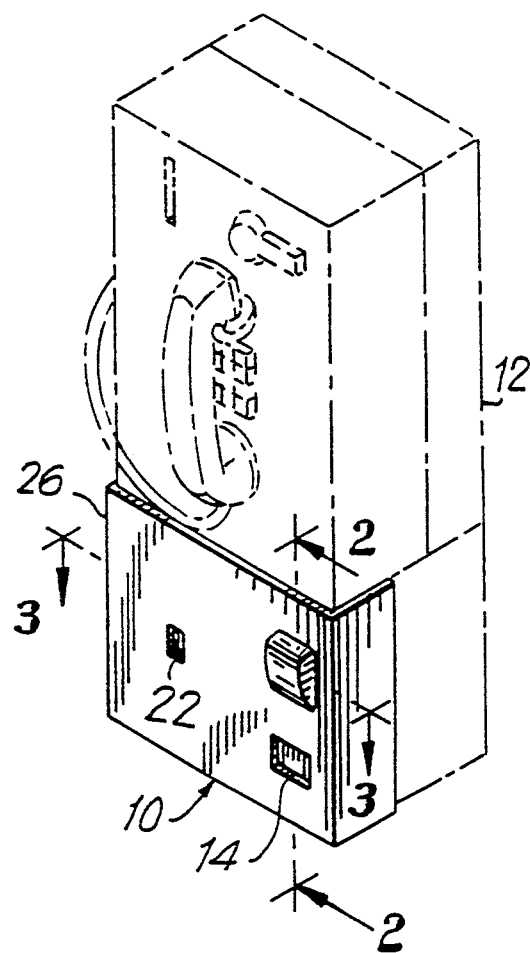
FIG. 1 is a frontal perspective view from the right side, of an apparatus for protection of coin operated telephones mounted on a coin operated telephone which is shown in phantom lines.

Referring initially to FIG. 1 there is illustrated an apparatus 10 for protecting a coin operated telephone 12 shown in phantom lines. The protection apparatus 10 is preferably constructed of a durable strong material such as stainless steel plate of 7 gauge thickness, i.e. about 3/16 inch thick. This compares significantly to prior art devices which were constructed of lesser substantial materials and thickness.

The apparatus 10 includes a coin retrieval opening 14 of dimensions sufficient to permit entry of the user's index finger to retrieve the coin(s) from the telephone coin return scoop immediately behind the opening, yet sufficiently small to prevent the introduction of jamming devices or explosives which could be used to destroy the telephone and remove the coins illegally from the coin box. It has been found preferable to dimension opening 14 approximately $1\frac{1}{8}$ inch in height and $\frac{7}{8}$ inch in width to permit sufficient access to the telephone coin return, yet prevent entry of illegal devices. These dimensions are only preferred and may be subject to modification as needed in any particular geographical region or public telephone location.

Figure 2:
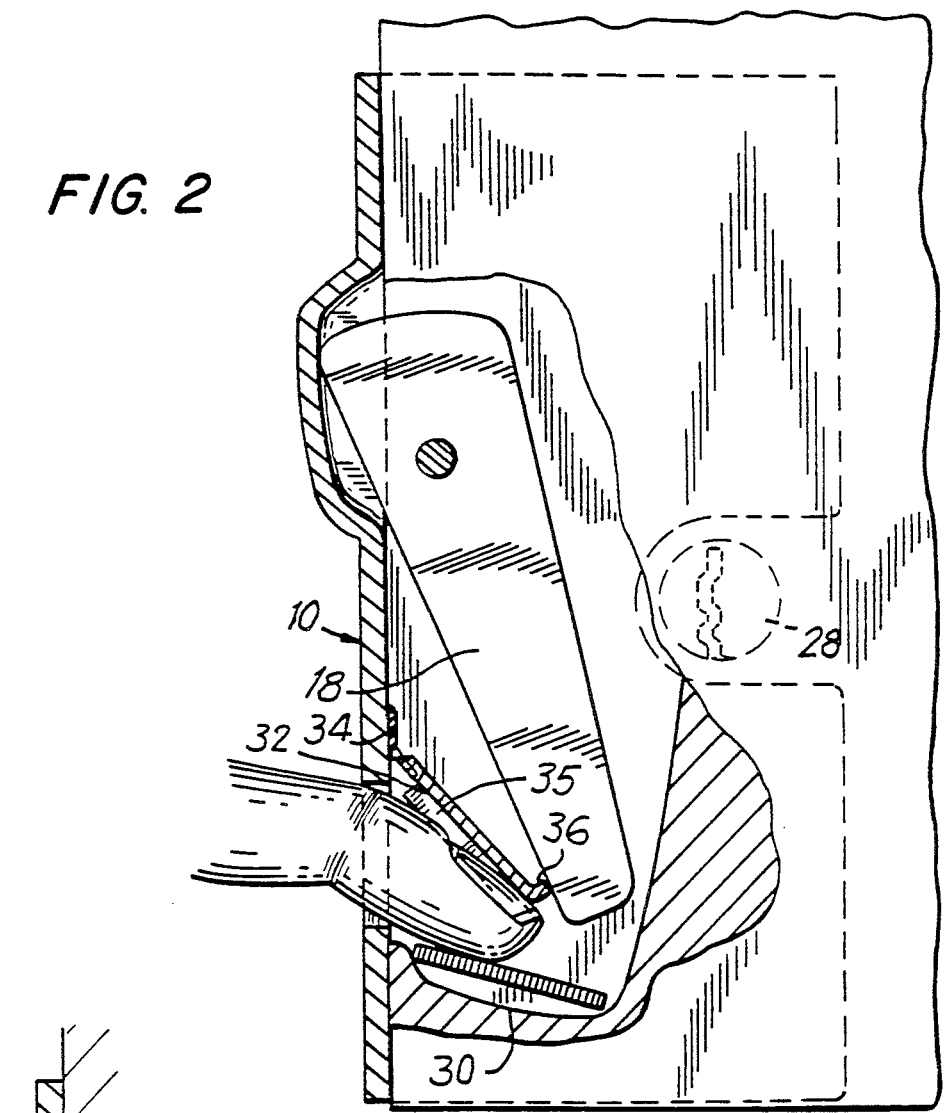
FIG. 2 is a cross-sectional view taken along lines 2—2 of FIG. 1, illustrating the limited movement provided to the coin return door of the telephone and the blocking door for the coin return access opening which forms part of the present invention.

The apparatus 10 also includes outwardly extending bubble 16, formed by swaging or other metal forming techniques, which permits outward pivotal movement of the upper portion of the coin return door 18, yet limits this movement as shown in FIG. 2. The limitation of pivotal motion of the upper portion of coin return door 18 prevents introduction of illegal devices at the lower end portion, including explosives, which may be used to remove coins illegally from the telephone. The bubble 16 is preferably formed as shown in FIGS. 1 and 2, or it may assume alternative shapes consistent with the scope of the invention, yet capable of limiting the outward pivotal movement of the upper portion of the coin return door 18.

The coin return door is mounted to the telephone as follows. The cash box of the telephone is usually positioned in the lower front portion adjacent the coin return opening and contains a cash box door 20 shown in FIG. 3. The cash box door 20 is locked and unlocked by a known locking device through key cylinder 22. This cash box door 20 is permanently attached to the rear surface of the protective apparatus 10 by suitable means such as a weld shown at 24, such that the entire protective apparatus may be removed from the telephone by simply removing the cash box door 20. Door 20 is generally referred to as a "vault door". This removal is simply accomplished through the opening 26 provided in the present apparatus, which permits access of the telephone key to the key cylinder 22. Access to a second optional lock and key cylinder 28 on the side of the telephone is provided by yet another cutout section 26 on the left side in FIG. 1 and shown more clearly on the right side of the embodiment of FIG. 4. This cutout section 26 in FIG. 1 is similar to the cutout section shown in FIG. 4, except the mirror image thereof.

Figure 5:
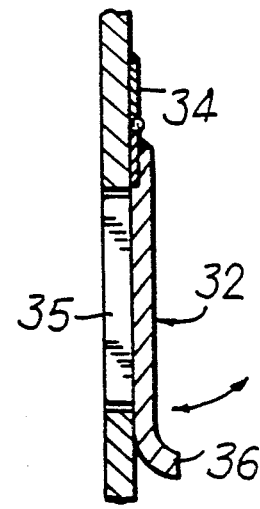
FIG. 5 is a cross-sectional view taken along lines 5—5 of FIG. 4 illustrating the coin return blocking door according to the invention.

Referring now to FIGS. 1 and 2, door 32 is mounted to the rear surface of the steel plate for pivotal movement by hinge 34 welded thereto. Hinge 34 is welded to the steel plate. Pivotal door 32 preferably has a rearwardly extending lip 36 generally perpendicular to the plane of door 32 as shown in FIGS. 2 and 5 to provide a marginal lip which engages the coin return door when the user's index finger is inserted into opening 14. The door is pivotally mounted as shown in FIG. 2 such that when the index finger of the user is inserted into opening 14 of the steel plate the door pivots rearwardly as shown in FIG. 2. In this position the area between the coin return door 18 and the steel plate is blocked, and thus prevents insertion of foreign objects such as paper, chewing gum, tissues, etc., to jam the coin return door in the rearward position. This prevents vandals from illegally storing coins as noted, i.e. behind the coin return door when jammed in the rearward position.

Figure 6:
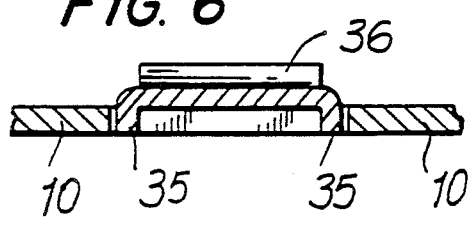
FIG. 6 is a cross-sectional view taken along lines 6—6 of FIG. 4 illustrating the preferred embodiment of the invention whereby flanges are provided along each side of the pivotal door and extend outwardly to prevent stuffing or tampering of the aperture for coin removal from the sides.
Figure 4:
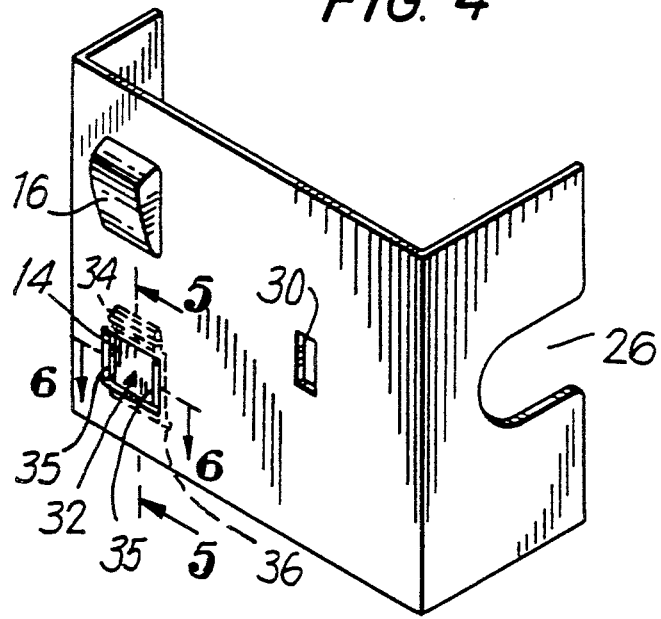
FIG. 4 is a frontal perspective view from the right side, illustrating the pivotal door of FIG. 2 in dotted lines as mounted to a telephone protective apparatus having the coin return on the left side with the pivotal door blocking the coin access opening shown.

To prevent tampering with pivotal door 32, at least the vertical dimension of the door is preferably larger than the vertical opening 14 in the steel plate as shown in FIG. 4 in dotted lines. In FIG. 6 there is shown outwardly extending vertical parallel flanges along each side of pivotal door 32 to prevent tampering or stuffing of aperture 14 from the sides. Although these vertical flanges preferably extend to the forward surface of the steel plate as shown, they may be constructed to extend outwardly of the surface, if desired. Optionally these flanges may be eliminated if desired. Further, the hinge 34 is preferably located above the upper margin of opening 14 thus preventing entry of tools or instruments to tamper with hinge 34. When the user's index finger is removed from opening 14, door 32 returns to its normal vertical position across opening 14 under influence of gravity.

Figure 3:
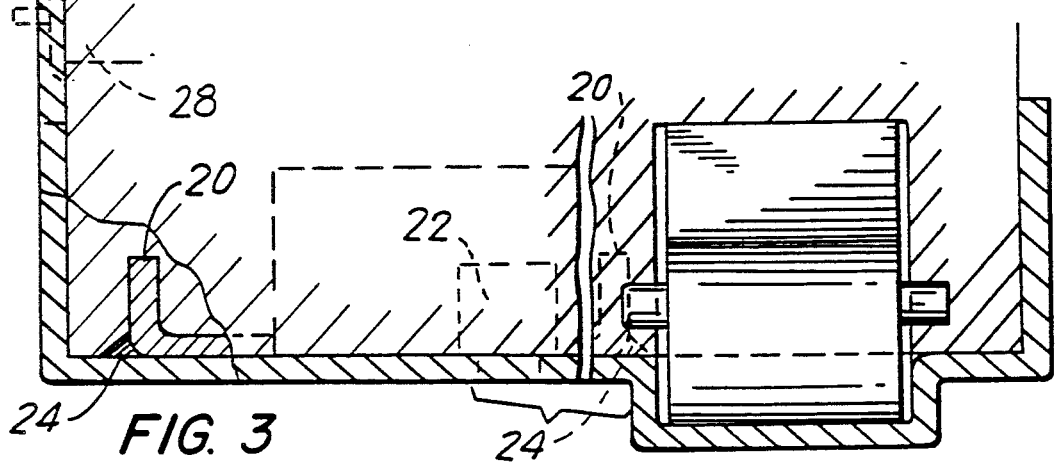
FIG. 3 is a cross-sectional view taken along lines 3—3 of FIG. 1.

In operation, the apparatus of the invention is supplied with the telephone cash box door welded to the rear surface as shown in FIG. 3. Thus, the door and the protective apparatus is removable and attachable to the telephone by personnel having valid and authorized keys for use in the front key cylinder access opening 30 as well as in the side lock and key cylinder 28. When installed on the telephone the user is prevented from having any more access to the coin return scoop then is necessary for removal of coins. Thus, limited access is shown clearly in FIG. 2.

In summary, the apparatus 10 of the invention provides at least the following significant functions:
1. Limits inward pivotal movement of coin return door 18;
2. Limits access to the coin return scoop 30 as shown in FIG. 2;
3. Protects the telephone from vandalism;
4. Prevents illegal entry into the telephone cash box and coin return areas;
5. Difficult to remove by vandals without attracting public attention;
6. Prevents illegal stuffing of the area between the coin return door and the steel plate thus preventing illegal storage of returned coins and illegal removal of the coins by removal of the stuffing;
7. Prevents tampering with the coin return system of the telephone.

The apparatus 10 is readily detachably removable from the telephone by authorized personnel who may periodically remove the coins from the cash box by removal of the apparatus 10 and the cash box door 20 utilizing authorized validly issued keys. The pivotal door is tamperproof and not removable due to the hidden location of hinge and the dimensions of pivotal door 30.

Referring to FIG. 4 there is shown an alternative embodiment of the apparatus 10 shown in FIG. 1. In the embodiment shown in FIG. 4, the coin return opening 14 and pivotal door "bubble" are positioned on the left side to accommodate telephones having the coin return opening and scoop on the left side. The pivotal door 14 is mounted as shown in FIG. 2 whether the coin return opening is on the left side as shown in FIG. 4 or on the right side as shown in FIG. 1. Telephones having the coin return opening on the left side are not shown in the drawings but may be readily visualized by reversing the positions of the coin return opening and coin scoop to the left side of the front portion of the telephone shown in FIG. 1 with the key cylinder 26 being just to the right of center. In FIG. 1, the key cylinder 26 is just to the left of center shown in FIG. 1. The inventive blocking door 32 for coin return access opening 14 will be mounted to the steel plate as shown, wherever the coin access opening is located.

I claim:

1. A protective cover for a coin operated telephone which extends substantially over the entire width of the telephone in the coin accumulation box and coin return regions, said cover having means to provide user access to the coin return opening of the telephone, and means attached to said cover in said coin return region and selectively movable by the user from a first position which blocks the coin return opening of the telephone and a second position which permits user access to the coin return region.

2. A protective cover for a coin operated telephone which includes a coin return opening and a pivotally mounted protective coin return door in the region of said coin return opening, which comprises:
 a) a protective plate dimensioned and configured to be removably attached to the telephone in the coin box and coin return opening regions of the telephone;
 b) means to provide user access to the coin return opening of the telephone; and
 c) means to protect the upper portion of the coin return door while permitting pivotal movement of said door to facilitate removal of coins through the coin return opening of the telephone; and
 d) means attached to said protective cover in the coin return region and selectively movable by the user from a first position which blocks the coin return opening of the telephone and a second position which permits access to the coin return opening while blocking access to the space between the coin return door and said protective plate.

3. The protective cover according to claim 2 wherein said means to provide user access to the telephone coin return opening is a coin removal access opening in said protective cover plate, said opening located over the coin return opening of the telephone.

4. The protective cover according to claim 3 wherein said means to block the coin return opening is a plate member pivotally attached to said protective cover over said coin removal access opening, said plate member pivotally movable from a first position which blocks said coin return access opening to a second position in engagement with said coin return door and which prevents insertion of objects in the space between said protective cover and said coin return door when said coin return door is pivoted to the coin removal position.

5. The protective cover according to claim 4 wherein said telephone includes a coin box for accumulation of user deposited coins.

6. The protective cover according to claim 5 wherein said coin box is adjacent said coin return opening and said protective plate extends across the width of the telephone over the coin box region and the coin return region.

7. The protective cover according to claim 6 wherein said protective plate is comprised of a stainless steel plate.

8. The protective cover according to claim 7 wherein said stainless steel plate is approximately 7 gauge stainless steel plate.

9. The protective cover according to claim 8 wherein said protective plate comprises a forwardly extending indentation which permits forward pivotal movement of at least a portion of said coin removal protective door of said telephone.

10. The protective cover according to claim 9 wherein said coin box includes a locked protective cover door and an opening is provided in said protective plate to permit key access to the lock of said coin box door.

11. The protective cover according to claim 10 further comprising means to provide access to a second lock for said coin box door positioned on one side portion of said telephone.

12. The protective cover according to claim 11 wherein said coin removal access opening in said cover plate has a rectangular shape.

13. The protective cover according to claim 12 wherein said rectangular opening is approximately 1½ inch in width and approximately ⅛ inch in height.

14. The protective cover according to claim 13 wherein said protective plate is attached to said coin box door by welding.

15. The protective cover according to claim 13 wherein at least the vertical dimension of said pivotal plate member is larger than the corresponding vertical dimension of said rectangular coin removal access opening to prevent tampering with said pivotal plate member.

16. A protective cover for a coin operated telephone which includes a coin box for locked reception of user deposited coins, coin return means for reception of coins returned to the user, access opening to provide user access to the coin return means, which comprises:
 a) a protective cover plate dimensioned to extend over the width of the telephone in the coin box and coin return area, said cover plate including rearwardly depending flanges at each end to protect at least portions of the sides of the telephone;
 b) an opening in said cover plate, said opening located over the coin return access opening of the telephone so as to provide user access to said coin return means;
 c) a plate member forming a door pivotally mounted over said coin return access opening of said cover plate and adapted to block said coin return access opening when at rest and pivotal to a second position by engagement of the user's finger to cause the coin return access door to pivot rearwardly, said protective cover door thereby blocking access to the region between said protective plate and coin return access door to prevent stuffing said space with foreign objects to prevent illegal removal of coins returned to users; and d) means to facilitate selective removal of said cover plate to provide selective access to the coin box for removal of coins therefrom.

17. A coin operated telephone having a coin box for reception and accumulation of user deposited coins, a protective door extending over the forward portion of said coin box, lock means to permit selective removal of said protective door for authorized removal of the coins, coin return means for reception of coins intended to be returned to the user, an opening which facilitates user access to said coin return means, which comprises:

a) a protective plate dimensioned to extend over the forward portion of the telephone in the coin box and coin return regions;

b) a pair of depending flanges extending rearwardly over side portions of the telephone to protect at least portions of the sides thereof;

c) means to attach said protective plate to the said protective door of said coin box such that said protective plate may be removed from the telephone by removal of said coin box protective door;

d) an aperture in said protective plate to provide key access to said lock of said coin box protective door;

e) an aperture in said protective plate to provide access to the user's finger to said coin return means to permit retrieval of coins retained to the user;

f) a protective door pivotally mounted to the rear surface of said protective plate to cover said coin return aperture when in the normal position, said protective door being pivotally movable rearwardly by engagement of the user's finger when removing coins from the coin return access opening so as to block the region between said protective cover and said coin return pivotal door to prevent illegal storage and removal of coins from the telephone; and g) integral means in said protective plate to permit forward pivotal movement of said coin return door and to limit said pivotal movement to a predetermined extent to provide protection to said coin return means.

18. The coin operated telephone according to claim 17 wherein said protective door positioned over said coin return access opening in said protective plate is rectangular and dimensioned slightly larger than the rectangular opening in said protective plate.

19. The coin operated telephone according to claim 18 wherein said protective pivotal door is positioned over said coin return access opening of said protective plate and is attached to a pivot hinge by a weld and said pivot hinge is attached to the rear surface portion of said protective cover by a weld.

20. The coin operated telephone according to claim 19 wherein said protective plate is positioned over said coin return access opening and includes a rearwardly extending lip along the lower margin, said lip dimensioned and positioned to engage the coin return protective door of the telephone when the user's finger is inserted into said aperture to remove coins from the coin return means.

21. A protective cover for the coinbox-containing portion of a pay telephone of generally box-like construction, comprising a front panel flanked by a pair of parallel, rearwardly-extending side wall panels to define a generally U-shaped construction, said construction adapted and arranged to closely abut the front and side panels of the telephone, said front panel being adapted to be permanently fastened to the coinbox cover of the telephone, and further having means located thereon to allow operation of and access to the coin return system of said telephone and to permit access to the coinbox removal means of said telephone, said means to allow access to the coin return system being provided with means selectively movable from a first position which blocks said access means to a second position which permits user access to the coin return system of said telephone.

22. The apparatus of claim 21 wherein said coin return access means comprises an entryway to the coin return slot and an integral raised portion of said front panel positioned to overlie the top portion of the coin return door plate of said telephone.

23. The apparatus of claim 22 wherein said coin return system of said telephone includes a pivotally mounted coin return door.

24. The apparatus of claim 23 wherein said means to block said entryway is a door pivotally attached to said front panel, said door dimensioned to block said entryway and movable to said second position whereby the lower marginal portion engages said coin return door of said telephone.

25. The apparatus of claim 24 wherein said coinbox removal means comprises a first notch in a side wall panel to expose a side-mounted lock on said telephone and a key entryway on said front panel aligned with the telephone coinbox lock.

26. The apparatus of claim 25 wherein said cover is fastened to said coinbox cover by welding.

27. A method for protection of a coin operated telephone from unauthorized removal of coins, the telephone having a coin box and coin return access opening adjacent the coin box region, a pivotal door to protect the coin return opening, which comprises:

a) providing a protective cover dimensioned to extend across the entire width of the telephone in the coin box area and being constructed of material and of thickness which protects the telephone coin box from unauthorized entry and the pivotal coin return door while permitting forward pivotal movement of the upper portion; and b) providing an opening in said protective cover directly over the coin return opening of the telephone, said opening being of sufficiently less dimensions than the coin return opening of the telephone so as to provide limited access to the coin return opening; and c) providing a pivotal door over said coin return opening in said protective cover whereby said pivotal door is movable from a first rest position blocking said opening to a second position in engagement with the coin return protective door of the telephone to prevent insertion of foreign objects therebetween to prevent illegal storage and removal of coins therefrom.

28. The protective cover according to claim 15 wherein a forwardly extending flange is positioned along each vertical side of said pivotal plate member to prevent tampering or stuffing of said rectangular opening from the sides.

29. The protective cover according to claim 28 wherein each said vertical side flange extends to the forward surface of said plate member.

30. In combination with a protective cover for the coinbox containing portion of a pay telephone wherein an aperture is provided in said cover to allow access to the coin return system of the telephone, the improvement in combination therewith which comprises a pivotal door attached to said protective cover and movable from a first position whereby said aperture is blocked by said pivotal door, to a second position which allows removal of coins from the coin return system of the telephone.

31. The protective cover according to claim 30 wherein said pivotal door has a vertical dimension greater than the vertical dimension of said aperture and includes a rearwardly extending flange at the lower portion to prevent tampering of stuffing at said lower edge portion.

32. The protective cover according to claim 31 wherein said pivotal door includes a vertical outwardly extending flange along each side to prevent tampering or stuffing from the sides.

33. The protective cover according to claim 32 wherein each said vertical flange is dimensioned about equal to the vertical dimension of said aperture to nestle therewithin, each flange extending forwardly to the forward surface of said cover.

* * * * *